Sept. 7, 1965

C. J. SOULES 3,204,748

HOP PICKING MACHINES

Filed July 18, 1962

INVENTOR
Charlie J. Soules

Sept. 7, 1965  C. J. SOULES  3,204,748
HOP PICKING MACHINES
Filed July 18, 1962  7 Sheets-Sheet 2

INVENTOR
Charlie J. Soules

Sept. 7, 1965    C. J. SOULES    3,204,748
HOP PICKING MACHINES

Filed July 18, 1962    7 Sheets-Sheet 3

INVENTOR
*Charlie J. Soules*

Sept. 7, 1965

C. J. SOULES

3,204,748

HOP PICKING MACHINES

Filed July 18, 1962

INVENTOR
Charlie J. Soules

Sept. 7, 1965  C. J. SOULES  3,204,748
HOP PICKING MACHINES

Filed July 18, 1962  7 Sheets-Sheet 7

INVENTOR
Charlie J. Soules

United States Patent Office 3,204,748
Patented Sept. 7, 1965

3,204,748
HOP PICKING MACHINES
Charlie J. Soules, 1115 Willow St., Yakima, Wash.
Filed July 18, 1962, Ser. No. 210,650
14 Claims. (Cl. 198—24)

This invention relates to hop picking machines and, more specifically, to hop picking machines in which the hop vines are automatically transferred from a Pomona conveyor to graspers carried by an endless conveyor which pulls the vines into the hop picking machine.

Hops are raised on trellises which are generally sixteen to eighteen feet in height and the hop vines attain substantially this height. When ripe, the hops have heretofore been picked by hand. However, because of conditions appurtenant to the growing of hops, the brevity of the picking season, the scarcity of labor, and other factors, hand picking of hops is unduly expensive. In addition, the most careful hand picking results in the accumulation of large quantities of leaves and other foreign material in the hops and the handling and delay involved in sacking or boxing the hops and transporting them to the drying house often results in discoloration, flattening, and bruising of the hops.

The difficulties and disadvantages attending the hand picking of hops has led to the development of hop picking machines. Such machines are of two general types, vertical and horizontal. It is with the latter type that the present invention is concerned.

When machine picking is employed, the hop vines are severed a short distance above the ground, taken down from the trellises, and transported to the hop picking machine. There, the vines are hooked onto a Pomona conveyor which is an endless chain conveyor equipped with specially designed hooks around which the ropelike ends of the hop vines may be looped. The Pomona conveyor, which travels in a horizontal path, carries the vertically hanging hop vines to the feed end of the picking machine. In the prior art machines, the vines are removed manually from the Pomona conveyor, generally by two men, and the ends of the vines are inserted between the jaws of graspers carried by the conveyor of the picking machine and the jaws are closed to grip the vines in the graspers. The conveyor drags the vines into the machine where the hops are stripped from the vines. Typical of the prior art machines described above are those disclosed in United States Letters Patent No. 2,139,029 issued to G. E. Miller December 6, 1938, for "Hop Picking Machine" and in United States Letters Patent No. 2,802,562 issued to W. J. Wissemann, August 13, 1957, for "Hop Vine Grasper."

The main objection to the prior art hop picking machines is the necessity of employing human operators or feeders to remove the vines from the hooks of the Pomona conveyors and insert and clasp them in the graspers carried by the conveyor of the hop picking machine. Not only is the labor cost high, especially as two operators are generally required, but hand feeding is relatively inefficient with the resulting waste generally costing even more than the necessary labor.

The present invention represents an improvement in horizontal hop picking machines and eliminates the need for human operators for disengaging the hop vines from the hooks of the Pomona conveyor and engaging them in the graspers of the hop picking machine conveyor. In the hop picking machine of the present invention, the hop picking machine and Pomona conveyor are positioned so that the Pomona conveyor will carry the hop vines into close proximity to the graspers on the hop picking machine. Each of the graspers (which are normally mounted in pairs in side-by-side relationship) is equipped with a simple, cam-type operator which opens the grasper jaws and then snaps them shut on the vine after the Pomona conveyor has positioned it in the jaws. Continued movement of the hop picking machine conveyor unhooks the vines from the Pomona conveyor and drags them up a ramp onto a horizontal deck and into the picking machine.

One important requisite to successful operation of a hop picker which will automatically transfer the vines from a Pomona conveyor is that the movement of the Pomona conveyor be timed to the movement of the graspers so that the hop vines will be between the jaws of the graspers when they are closed. For this purpose, a novel simple mechanical timing and positioning mechanism operated by the movement of the graspers is employed.

Another criteria for successful operation of a hop picking machine arranged to automatically remove the hop vines from the Pomona conveyor is that the hop vines clasped in the graspers quickly move out of the way of the following vines delivered by the Pomona conveyor. This is particularly necessary in view of the fact that the sixteen to eighteen foot long hop vines are quite shaggy or bushy throughout most of their length and, if they are not quickly moved out of the way, will become entangled in the conveyor of the hop picking machine. In contrast to the prior art machines such as that disclosed in the Wissemann patent referred to above, where the hop vines are dragged onto a horizontal deck from a position in front of the picking machine, the novel machine of the present invention is arranged to clasp the hop vines while they are hanging vertically from the Pomona conveyor and move them forward a substantial distance in the vertical position to almost immediately get them out of the way of the incoming vines.

Another criteria in the successful operation of a hop picking machine of the type provided by the present invention and, indeed, any horizontal hop picker, is that the graspers firmly clasp the hop vines. Numerous attempts have been made to construct a satisfactory grasper as evinced by the numerous patents directed to such graspers including those to Miller and Wissemann, referred to above, and United States Letters Patent No. 2,193,354 issued to E. Thys March 12, 1940, for "Vine Grasper Bar." The present invention also provides improved graspers which are simpler and yet operate more effectively than those of the prior art.

A primary object of the present invention resides in the provision of improved hop picking machines of the horizontal type.

It is another object of the present invention to provide horizontal type hop pickers which will automatically transfer hop vines from a Pomona or other delivery conveyor to graspers carried by the conveyor of the hop picking machine, thereby eliminating the need for human operators.

In conjunction with the preceding object, it is another object of the present invention to provide novel mechanical timing and positioning mechanisms which will accommodate variations in the relative movement of the Pomona conveyor and the graspers carried by the conveyor of the hop picking machine and insure that, regardless of such variations, the vines are properly aligned with the graspers.

In conjunction with the preceding object, it is a further object of the present invention to provide novel timing and positioning mechanisms which, if the mechanism malfunctions, will be operated to prevent it from damaging the grasper bar on which the graspers are mounted as the grasper bar moves into proximity with and engages the timing and positioning mechanism.

Another object of the present invention resides in the provision of novel hop picking machines of the horizontal type which will automatically clasp hop vines delivered in a vertical hanging position to the machine by a Pomona conveyor in graspers carried by the picking machine conveyor, unhook the vines from the Pomona conveyor, and then move the vines forward still in the vertical hanging position to automatically clear the way for succeeding vines delivered by the Pomona conveyor.

A further object of the present invention is the provision of improved graspers for hop picking machines.

Yet another object resides in the provision of graspers for hop picking machines equipped with cam-type operators for automatically opening the grasper jaws and snapping them shut on a vine inserted between the jaws.

Other and further objects of the present invention will become fully apparent from the appended claims and as the ensuing detailed description and discussion proceeds in conjunction with the accompanying drawing, in which:

Figure 1:
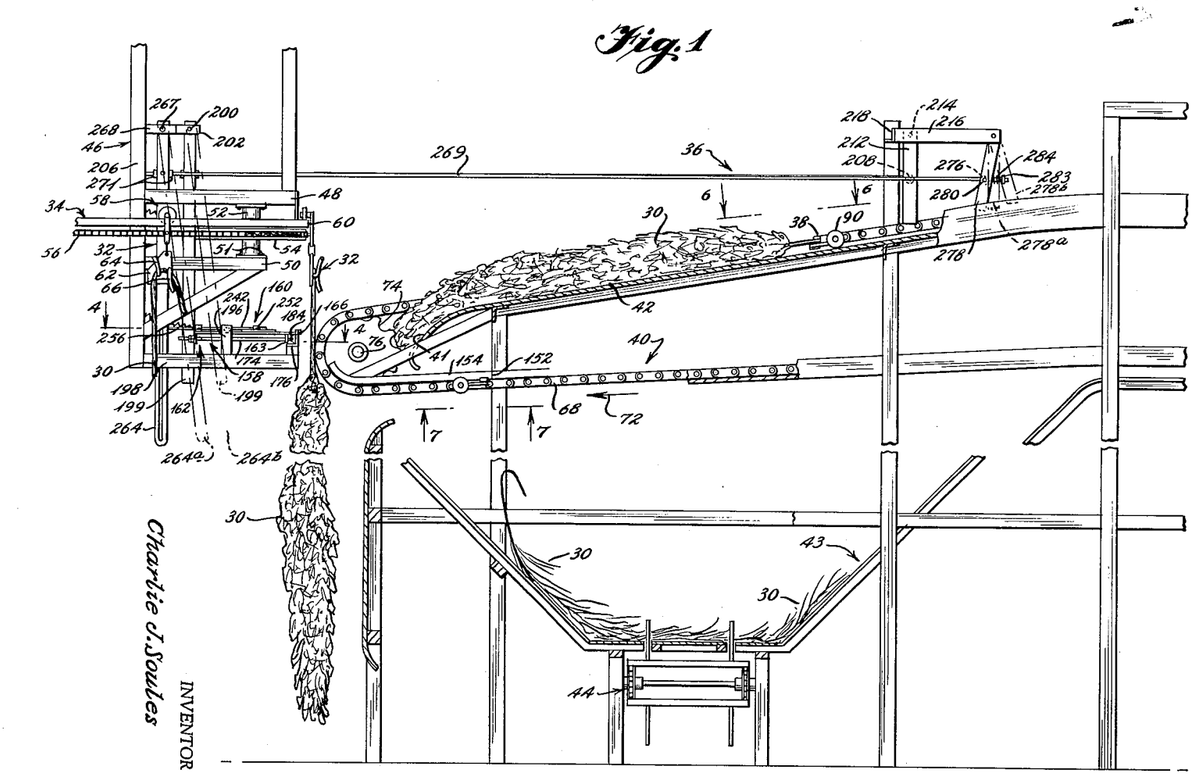
FIGURE 1 is a side view of the novel hop picking machine provided by the present invention together with a Pomona conveyor provided for delivering hop vines to the picking machine.

Referring now to FIGURE 1 of the drawings, hop vines 30 are unloaded from a truck or other conveyance (not shown) and attached to the hooks 32 of a Pomona conveyor 34 which transports them to the feed end of a novel hop picking machine 36 provided by the present invention. There the vines are automatically transferred to graspers 38 and 38' (see also FIGURE 6) carried by an endless conveyor 40 and pulled up a ramp 41 and along a substantially horizontal deck 42 into the interior of the machine (not shown) where the hops are plucked from the vines. The stripped vines are discharged into a trough 43 from which they are removed by an endless conveyor 44.

Figure 2:
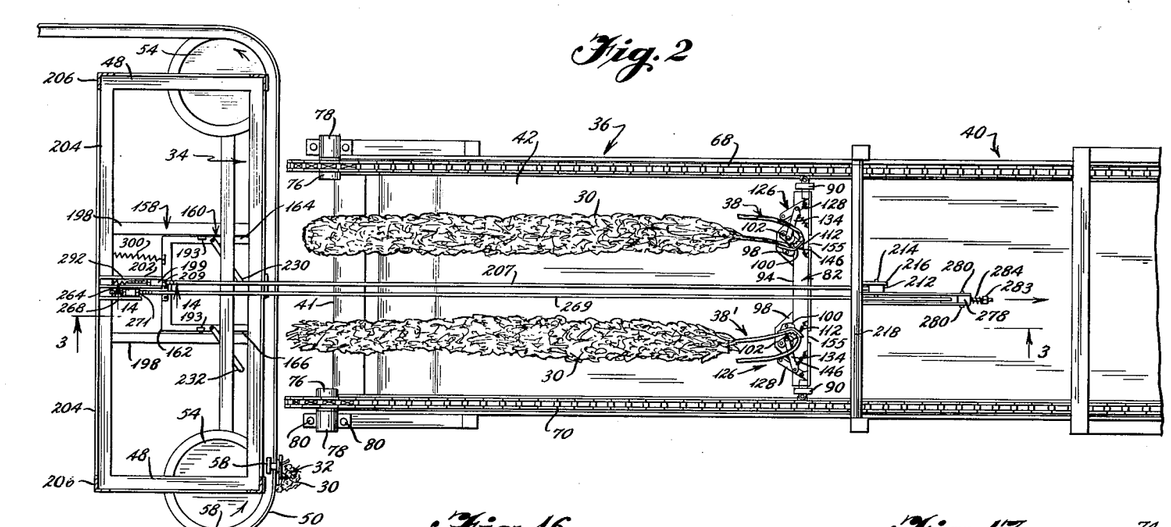
FIGURE 2 is a top plan view of the hop picking machine and Pomona conveyor of FIGURE 1.

As shown in FIGURES 1 and 2, Pomona conveyor 34 includes a framework assembled from structural members and identified by reference character 46. Fastened to horizontally extending members 48 and 50 of this framework as by bolts 51 are two vertically extending shafts 52 on which idler pulleys 54 are rotatably mounted by appropriate bearings (not shown). Passed around pulleys 54 is a chain 56 which is moved in the direction of the arrow in FIGURE 1 by a driven pulley (not shown) at the other end of the Pomona conveyor. Fixed to chain 56 at equal intervals are trolleys 58 from which Pomona hooks 32 are suspended. Trolleys 58 ride on a horizontally extending track 60 supported by the Pomona conveyor framework 46.

Pomona hooks 32 each include a base plate 62 and a pair of fingers 64 and 66, fixed to base plate 62, over which the rope-like ends of the hop vines 30 are looped. As is conventional, fingers 64 and 66 are so formed that upward vertical movement of the hop vines will release their ends from the Pomona hook.

Since Pomona conveyor 34 is of conventional construction and since its details form no part of and are not essential to an understanding of the present invention, a more detailed description of the Pomona conveyor is not deemed necessary.

As discussed above, it is one of the novel features of the present invention that the hop vines 30 are automatically transferred from Pomona conveyor 34 to the graspers 38 and 38¹ carried by the endless conveyor 40 of hop picking machine 36. Referring now to FIGURES 1, 2, 5 and 6, conveyor 40 includes two endless flexible members 68 and 70 such as roller chains which travel in the direction of arrow 72 in FIGURE 1 and are supported at the feed end of the machine by idler sprockets 74 (only one of which is shown). At the forward end of the hop picking machine, roller chains 68 and 70 extend over driven sprockets (not shown) which may be rotated by any suitable power source.

Figures 4, 10, 11:
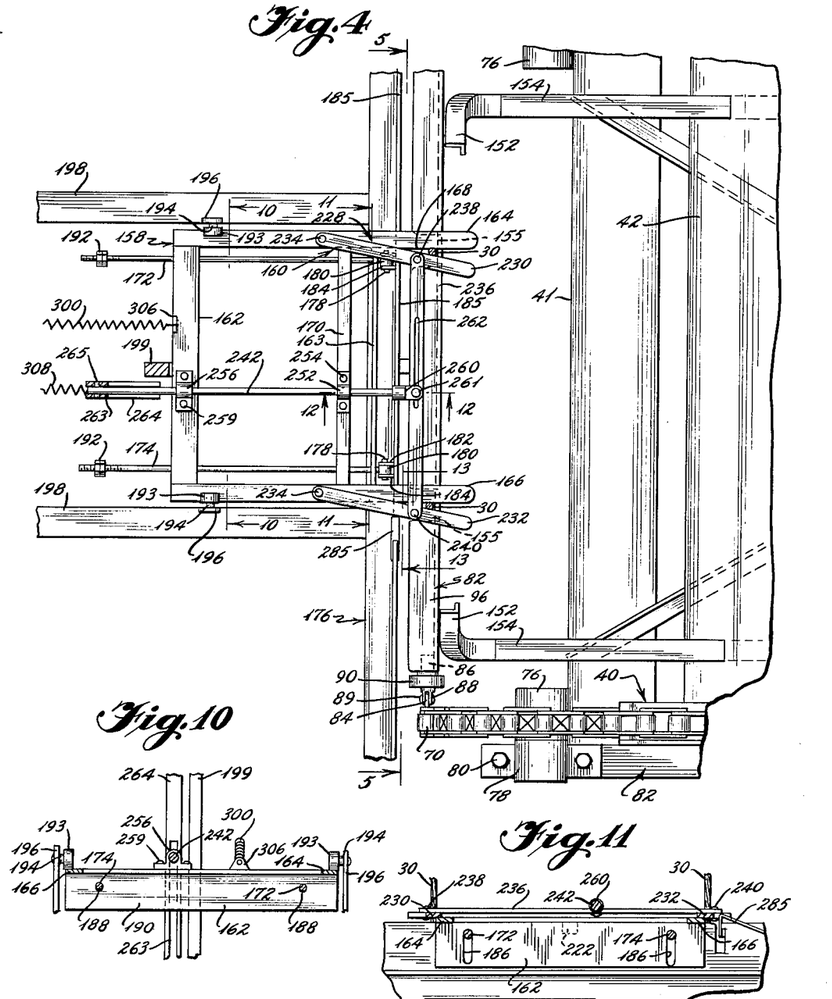
FIGURE 4 is a top plan view of the mechanism illustrated in FIGURE 3, looking in the direction of arrows 4—4 in FIGURE 1.
FIGURE 10 is a sectional view of the vine positioning and aligning mechanism and is taken substantially along line 10—10 of FIGURE 4.
FIGURE 11 is a sectional view of the vine positioning and aligning mechanism and is taken substantially along line 11—11 of FIGURE 4.

As is best shown in FIGURES 2 and 4, idler sprockets 74 are fixed to stub shafts 76 which are journalled in suitable bearings 78 fixed by bolts 80 to the hop picking machine's structural framework.

Figure 6:
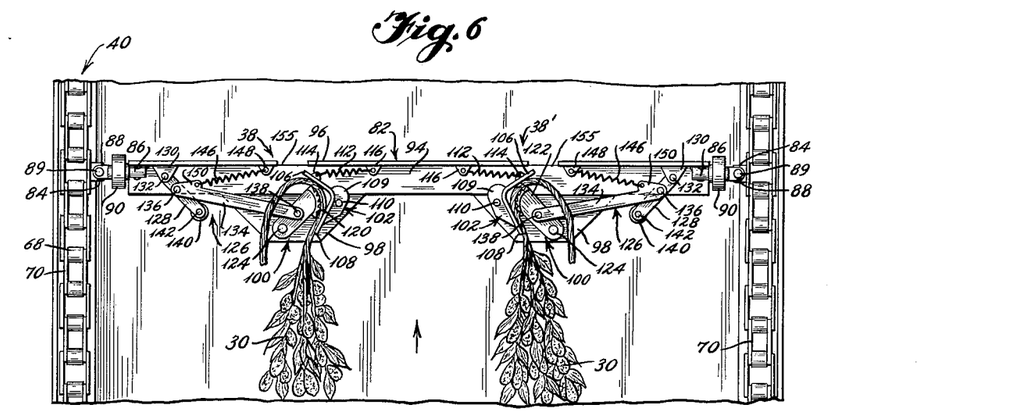
FIGURE 6 is a top plan view of a portion of the hop picking machine and is taken substantially along line 6—6 of FIGURE 1.

Extending between and fixed at their opposite ends to roller chains 68 and 70 are a plurality of grasper bars 82 spaced at equal intervals along the path of the conveyor. As is shown in FIGURE 6, the mechanism employed to attach grasper bars 82 to roller chains 68 and 70 include inwardly directed lugs 84 fixed to the roller chains in any desired manner and so positioned that they are aligned on a line normal to the direction of movement of conveyor 40. Pivotally fixed to each of the lugs 84 is a cylindrical pin 86 having a pair of bifurcated arms 88 embracing the associated lug 84 and secured to it by a pin 89. The inward ends of cylindrical pins 86 are fixed to the opposite ends of the grasper bars 82 as by welding or brazing. Rollers 90, journalled on pins 86 between the ends of grasper bar 82 and lug 84, space grasper bar 82 above and prevent it from rubbing on the deck 42 of the hop picking machine.

Grasper bars 82 are fashioned from angle iron disposed to provide a horizontal leg 94 and a vertical leg 96. Welded to the lower surfaces of the horizontal angle iron legs 94 are the base plates 98 of graspers 38 and 38$^1$.

Figures 19, 20:
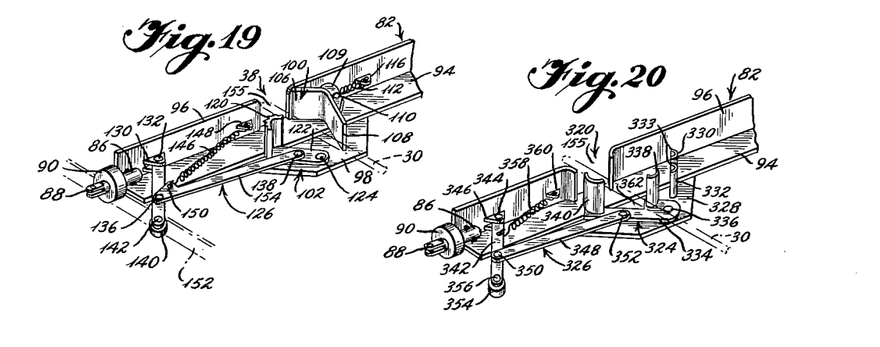
FIGURE 19 is a perspective view of a preferred form of the grasper.
FIGURE 20 is a perspective view of an alternate form of grasper.

Each of the graspers 38 and 38$^1$ (which are identical) has two pivotally mounted jaws 100 and 102. Referring now specifically to FIGURE 19, jaw 100 is a metal bar of appropriate thickness bent intermediate its ends to provide a pair of angularly disposed legs 106 and 108 extending upwardly from base plate 98. Jaw 100 is pivotally mounted on grasper bar 82 by a horizontal disposed arm 109 fixed to the outer side of the jaw and a bolt or pivot stud 110 which extends through arm 109 and base plate 98.

A tension spring 112, attached at its opposite ends to a lug 114 (see FIGURE 5) fixed to arm 109 of jaw 100 and to a lug 116 fixed to the vertical leg 96 of grasper bar 82, biases jaw 100 in a clockwise direction (looking down on the grasper bar) about pivot stud 110.

Pivotal jaw 102 is an upwardly extending, arcuately sectioned member on which a plurality of parallel teeth 120 with their biting edges directed toward the vertical leg 96 of grasper bar 82 are formed. At its lower end, jaw 102 is fixed to one end of a horizontally extending mounting arm 122, the other end of which is pivotally fixed as by a bolt or pivot stud 124 to base plate 98.

The jaws 100 and 102 of grasper 38 are opened and closed by an operator 126 which is controlled by the movement of a grasper bar 82. Operator 126 includes a horizontally extending operator arm 128 pivotally fixed to the vertical leg 96 of grasper bar 82 by a pair of brackets 130 between which one end of operator arm 128 extends and a bolt or pivot stud 132 which extends through the mounting brackets and the operator arm. Extending between and pivotally connected to operator arm 128 and the arm 122 carrying jaw 102 is a rigid connecting link 134 which is fixed to operator arm 128 by a bolt or pivot stud 136 and to arm 122 by a bolt or pivot stud 138.

Fixed to the end of operator arm 128 opposite its connection to grasper bar 82 is a cam roller 140 which is rotatably mounted on a shaft 142 fixed to operator arm 128 as by welding. Jaw 102 is biased in a clockwise direction (looking downwardly) by a tension spring 146 attached at one end to a lug 148 fixed as by welding to grasper bar vertical leg 96 and at the other to a projection 150 formed on connecting link 134.

Figure 5:
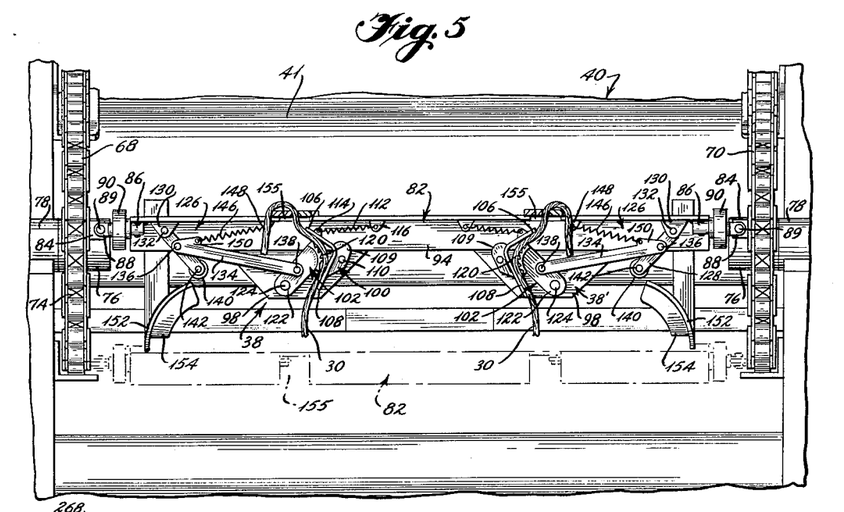
FIGURE 5 is an elevational view of the feeding end of the hop picking machine looking substantially along line 5—5 of FIGURE 4.
Figure 7:
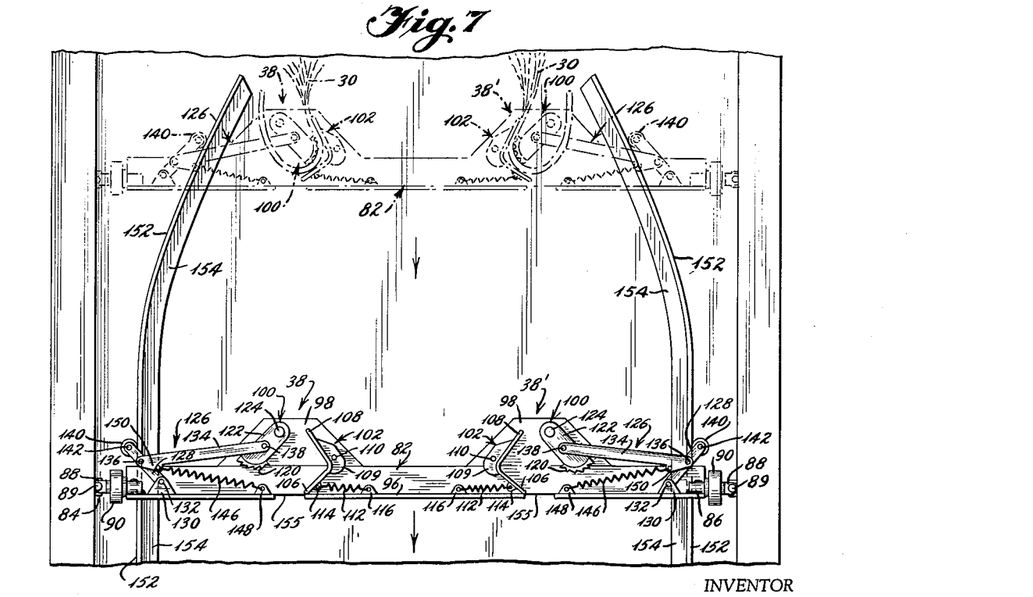
FIGURE 7 is a bottom plan view of a portion of the hop picking machine and is taken looking upwardly substantially in the direction of arrows 7—7 of FIGURE 1.

Cam rollers 140 cooperate with generally vertical cam surfaces 152 provided by parallel, spaced, generally horizontal angle irons 154. As is best shown in FIGURES 1, 5, and 7, angle irons 154 are fixed to the framework of the hop picking machine adjacent the end sprockets 74 over which the roller chains 68 and 70 travel and extend from the feed end of the machine a point above trough 43. The portions of angle irons 154 remote from the feed end of the hop picking machine are horizontal and at substantially the level of the lower run of the conveyor 40. In the vicinity of sprockets 74, angle irons 154 curve upwardly and inwardly (as is best shown in FIGURES 5 and 7), terminating slightly below the centers of sprockets 74.

In the ensuing description of the manner in which the graspers 38 and 38$^1$ operate, only the operation of grasper 28 will be described since grasper 38$^1$ operates in an identical manner, although in the opposite sense.

As conveyor 40 moves in the direction indicated by arrow 72 in FIGURE 1, cam roller 140 of a grasper 38 engages the ends of the associated angle iron 154 remote from the feed end of the machine and rides onto cam surface 152 which pivots operator arm 128 in a clockwise direction, pulling the associated connecting link 134 toward roller chain 68 and pivoting arm 122 in a counterclockwise direction. This moves jaw 102 away from jaw 100 and releases the stripped hop vine 30 which falls into hopper 43. As the grasper bar 82 moves toward the feed end of the hop picking machine and sprockets 74, cam roller 140 will reach the inwardly and upwardly curved portion of angle iron 154. At the same time, the Pomona conveyor 34 will move a hop vine 30 to a position such that, as the grasper 38 moves upwardly over the end sprockets, the upper, rope-like end portion of the vine will be positioned between grasper jaw 100 and 102. A notch 155, formed in the upper leg 96 of the grasper bar (which will become horizontal as the grasper bar moves up over end sprockets 74), permits the hop vine to move freely between the grasper jaws.

As the grasper 38 continues upwardly with the cam roller 140 riding on the converging, inwardly directed portion of the cam surface 152, tension spring 146 will pull connecting link 134 to the right, pivoting arm 122 in a clockwise direction and moving jaw 102 toward jaw 100. As jaw mounting arm 122 pivots in a clockwise direction, jaw 102, pressing against the end of hop vine 30, tends to pivot jaw 100 in a clockwise direction about pivot stud 110, tightly clamping the vine end between the jaws 100 and 102. Further upward movement of grasper 38 unhooks the hop vine 30 from the Pomona conveyor hook 32 to which it was attached. As the grasper 38 then travels over the top of sprockets 74 and travels forwardly along the upper reach of the conveyor, it moves the still vertically hanging hop vine 30 forward and out of the way of the incoming vines on the Pomona conveyor. Forward of sprockets 74, the hop vine is dragged up ramp 41 and along deck 42 to the interior of the hop picking machine.

The movement of the incoming hop vines must be accurately timed relative to the movement of the grasper bars 82 so that the ends of the hop vines will be positioned between the open jaws 100 and 102 of the graspers 38 and 38$^1$ as the grasper bar 82 carries the graspers up and over the end sprockets 74 of the hop picking machine. The hop vine guiding and aligning mechanism employed for this purpose, as best shown in FIGURE 4, includes a hop vine stop assembly 158 and a hop vine aligning assembly 160.

Figure 18:
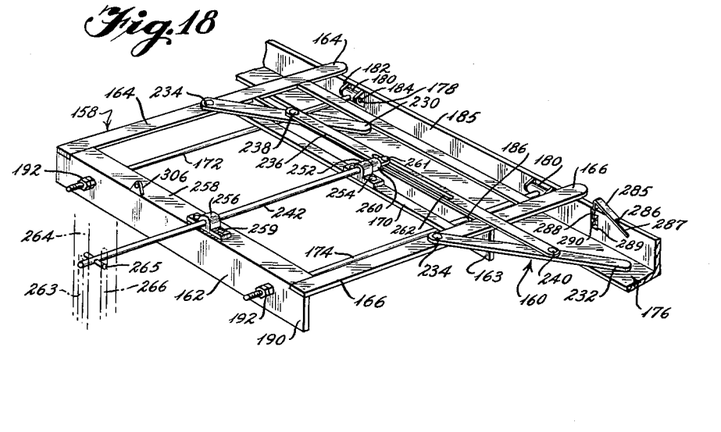
FIGURE 18 is a perspective view of a portion of the hop vine positioning and aligning mechanism.

With continued reference to FIGURE 4 and with reference also to FIGURE 18, hop vine stop assembly 158 includes a transversely extending angle iron 162 and a transversely extending bar 163 to which a pair of forwardly extending, parallel, spaced fingers 164 and 166 are fixed as by welding. Transverse braces 168 and 170 are fixed between fingers 164 and 166 adjacent their ends opposite angle iron 162 and between angle iron 162 and bar 163 respectively, to strengthen the assembly.

Figure 8:
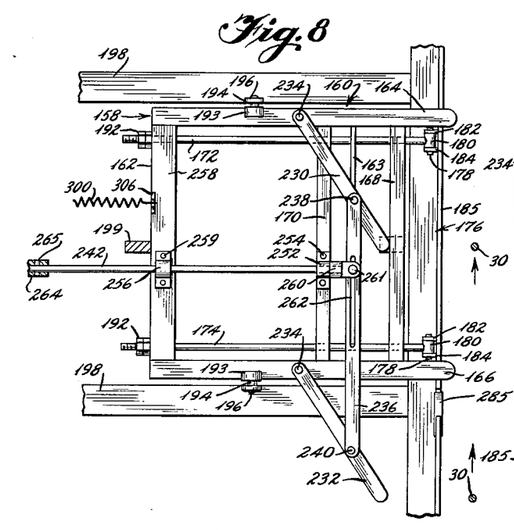
FIGURE 8 is a top plan view of the vine positioning and aligning mechanism in the retracted position.
Figures 9, 15:
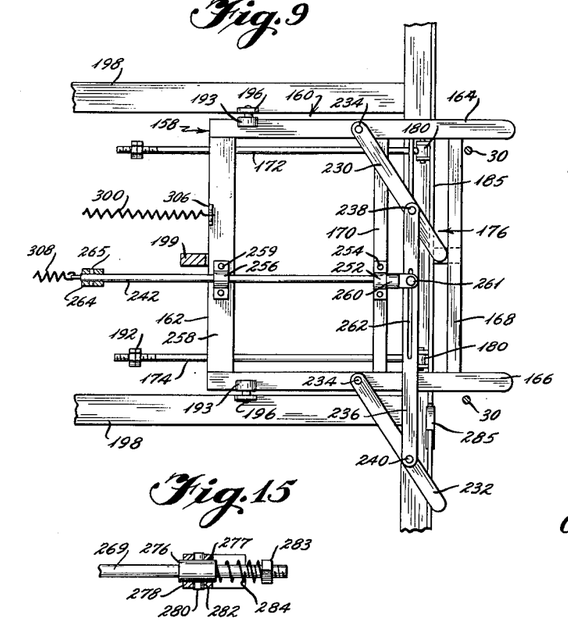
FIGURE 9 is a view similar to FIGURE 8 with the vine stopping fingers extended to their operative position.
FIGURE 15 is a plan view, to an enlarged scale, of an override mechanism employed in the hop vine positioning and aligning mechanism.
Figure 12:
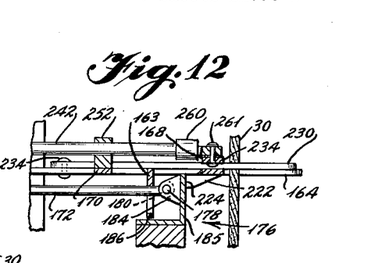
FIGURE 12 is a further sectional view of the vine positioning and aligning mechanism and is taken substantially along line 12—12 of FIGURE 4.

Stop assembly 158 is mounted for forward and backward reciprocal movement between the positions shown in FIGURES 8 and 9 on a pair of parallel, spaced apart support rods 172 and 174. Support rods 172 and 174 are pivotally fixed to a transversely extending channel 176 in the hop picking machine framework 46 by pivot studs 178 which extend through sleeves 180 fixed to the forward ends of the support rods and aligned apertures in lugs 182 and 184 which are disposed on opposite sides of each sleeve and fixed to the vertical leg 185 of angle iron 176. Support rods 172 and 174 extend rearwardly through vertically elongated apertures 186 in transverse bar 163 (see FIGURES 11 and 12) and apertures 188 (see FIGURE 10) in the vertical leg 190 of angle 162. Nuts 192, threaded on the rear end of support rods 172 and 174, provide stops and limit the rearward movement of the stop assembly.

Figure 3:
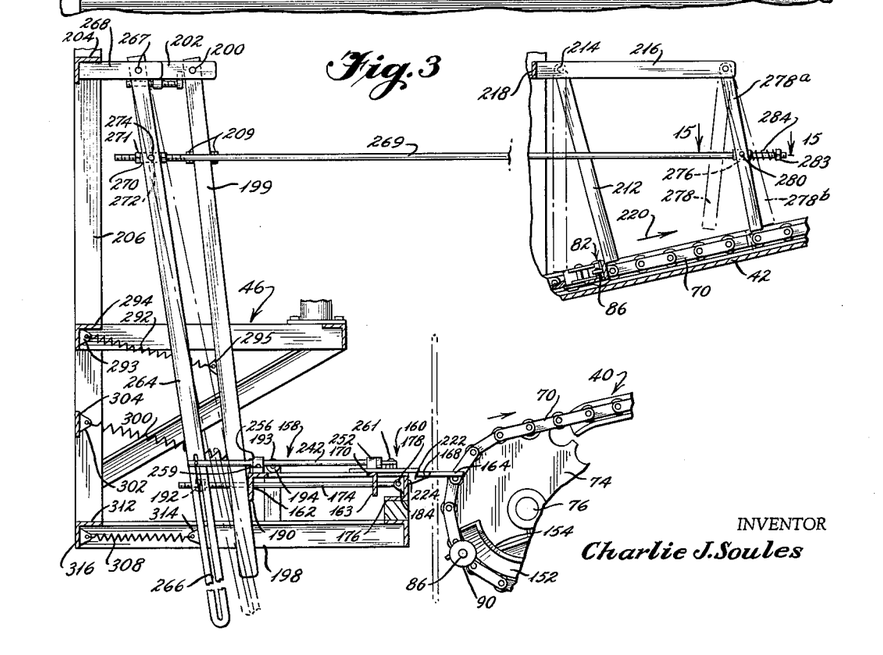
FIGURE 3 is a fragmentary side view, to an enlarged scale, of the hop picking machine taken substantially along line 3—3 of FIGURE 1 and illustrates the novel mechanism provided by the present invention for transferring hop vines from the Pomona conveyor to the hop picking machine without the intervention of human operators.

As it moves back and forth, the stop assembly is maintained substantially level by rollers 193 which engage the upper surfaces of fingers 164 and 166 and are rotatably mounted on stub shafts 194. Brackets 196 (see FIGURE 3), which extend upwardly from horizontally disposed, longitudinally extending channels 198 in the hop picking machine framework, support the stub shafts 194 to which the rollers are attached. Stop assembly 158 is moved forward from the position shown in FIGURE 8 to the position shown in FIGURE 9 in timed relation to the movement of Pomona conveyor 32 so that as a grasper bar 82 carrying graspers 38 and 38¹ moves along the lower run of conveyor 40 and approaches end sprockets 74, a hop vine 30 will be carried by the Pomona conveyor against each of the fingers 164 and 166. In their finger-engaging position, the ends of the hop vines 30 are properly positioned so that, as the grasper bar 82 travels upwardly around end sprockets 74, the ends of the vines will be positioned between the jaws 100 and 102 of the graspers 38 and 38¹ carried by the grasper bar. Referring now to FIGURES 2–4, stop assembly 158 is moved forwardly by an operating lever 199, the lower end portion of which bears against the vertical leg 190 of the transversely extending angle iron 162. At its upper end, operating lever 199 is fixed by a pivot stud 200 to a horizontally extending bracket 202. Bracket 202 is supported on a horizontally extending channel 204 in the hop picking machine framework which extends between vertical channels 206 (see also FIGURE 2). Pivotally fixed to operating lever 199, adjacent its upper end, is a rigid, forwardly extending, connecting link 207.

Figure 14:
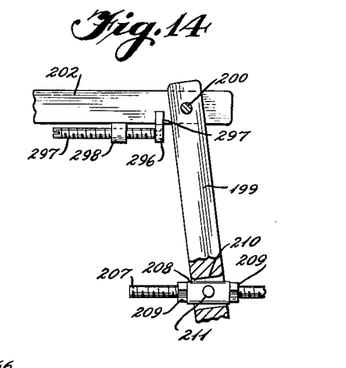
FIGURE 14 is a sectional view of the hop vine aligning and positioning mechanism taken substantially along line 14—14 of FIGURE 2.

Referring now specifically to FIGURE 14, the end of connecting link 207 extends through a sleeve 208 to which it is fixed by nuts 209, threaded on the connecting link, which engage the opposite ends of the sleeve. Sleeve 208 is pivotally mounted in a slot 210 in operating lever 199 by pivot studs 211 which are fixed to the opposite sides of the sleeve and extend through aligned apertures (not shown) in the operating lever. The forward end of connecting link 207 is fixed to a vertically depending actuating lever 212 connected by a pivot stud 214 to a bracket 216 which, in turn, is fixed as by welding to a horizontally extending channel 218 in the hop picking machine framework. Actuating lever 212 is so dimensioned that, as the grasper bars 82 move in the direction of the arrow 220 (see FIGURE 3) along the upper run of conveyor 40, the lower end of actuating lever 212 will be engaged by the vertical legs 96 of the grasper bars. As the engaged grasper bar 82 then continues to move forwardly in the direction of the arrow, it will pivot actuating lever 212 from the position shown in phantom lines in FIGURE 3 to the position shown in solid lines, pulling link 207 forwardly and pivoting operating lever 199 in a counterclockwise direction, thereby moving stop assembly 158 forward from the position shown in FIGURE 8 to the position shown in FIGURE 9.

Referring now specifically to FIGURE 3, a latch 222 is welded or otherwise fixed to the lower side of the transverse brace 168 in stop assembly 158. When operating lever 199 has moved the assembly forward to the FIGURE 9 position, the vertical rear edge 224 of latch 222 will engage the forward surface of the vertical leg 185 of the angle iron 176 to which support rods 172 and 174 are attached to retain the stop assembly in the position shown in FIGURES 3 and 9.

It will often happen that the movement of the Pomona conveyor relative to the grasper bars 82 of the hop picking machine conveyor 40 is so slow that hop vines 30 will not have moved against fingers 164 and 166 of stop assembly 158 by the time that the grasper bars 82 are proceeding upwardly over the end sprockets 74 of the conveyor 40 so that the hop vine ends will not be properly aligned between the jaws of the graspers 38 and 38¹. To preclude this from happening, the hop vine aligning assembly 160 (see FIGURES 4, 8 and 9) is employed. Assembly 160 includes a pair of hop vine gathering and pushing fingers 230 and 232 pivotally fixed, respectively, to the fingers 164 and 166 of stop assembly 158 by pivot studs 234. Fingers 230 and 232 are connected by a transversely extending, rigid link 236 pivotally connected to fingers 230 and 232 by pivot studs 238 and 240 respectively.

In operation, the hop vine gathering and pushing fingers 230 and 232 are moved from the position shown in FIGURES 8 and 9 in a counterclockwise direction to the position shown in FIGURE 4 to push the ends of the hop vines 30 against the stop fingers 164 and 166 so that the hop vine ends will be properly aligned between the jaws of the graspers 38 and 38¹ as the latter move upwardly on a grasper bar 82 over end sprockets 74. The mechanism provided for moving the fingers 230 and 232 to the position of FIGURE 4 includes an operating rod 242 reciprocably mounted in a bushing 252 fixed to the transverse brace 168 of stop assembly 158 as by rivets 254 and in a bushing 256 fixed to the horizontal leg 258 of stop assembly angle iron 162 as by rivets 259. Fixed to the forward end of operating rod 242 is coupling 260 which is slidably fixed to the rigid link 236 connecting the fingers 230 and 232 by a pin 261 which extends through the coupling and a transversely extending, elongated slot 262 in the connecting link.

The rear end of operating rod 242 extends through an elongated slot 263 adjacent the lower end of an operating lever 264 and is slidably connected to the lever by a pin 265 which extends through the operating rod and through elongated slots 266 in the operating lever (which intersect slot 263). The upper end of operating lever 264 is pivotally connected by a pivot stud 267 to a horizontal bracket 268 fixed to horizontally extending angle 204 adjacent the bracket 202 from which operating lever 199 is supported. Pivotally connected to operating lever 264 below its upper end is a forwardly extending, rigid connecting rod 269. The end of connecting rod 269 extends through a sleeve 270 identical to the sleeve 208 described above (and shown in FIGURE 14) to which it is fastened by nuts 271 threaded on the rod and engaging the opposite ends of the sleeve. Sleeve 270 is mounted in a slot 272 in operating lever 264 and pivotally connected to the lever by pivot pins 274 (only one of which is shown) which are fixed to the opposite sides of the sleeve and extend through aligned apertures (not shown) in the lever.

Referring now specifically to FIGURE 15, the forward end of connecting rod 268 extends through a sleeve 276 which is disposed in a slot 277 in an actuating lever 278 and pivotally connected to the lever by pivot studs 280 which are fixed to opposite sides of the sleeve and extend through aligned apertures 282 in the lever.

Journalled on connecting rod 268 between sleeve 276 and a nut 283 threaded on the end of the rod is a relatively stiff override spring 284. In normal operation, override spring 284 acts as a solid link between connecting rod 269 and the sleeve 276 fixed to actuating lever 278.

As was pointed out above, the movement of a grasper bar 82 along the upper reaches of conveyor 40 in the direction of the arrow 220 (see FIGURE 3) moves stop assembly 158 forward from the position shown FIGURE 8 to the position shown in FIGURE 9. As is best shown in FIGURES 1 and 9, the hop vine aligning assembly moves forwardly with the stop assembly, its operating and actuating levers 264 and 278 moving from the positions shown in solid lines in FIGURE 1 to the positions shown in dotted lines and identified by reference characters 264a and 278a.

As shown in FIGURES 1 and 3, the actuating lever 278 of aligning assembly 160 is spaced forwardly of the actuating lever 212 of the stop asesmbly 158. The spacing is so arranged that stop assembly 158 will be moved forward and latched in its operative position before grasper bar 82 reaches the actuating lever 278 of assembly 160.

When the latter lever is reached by grasper bar 82, its lower end will be engaged by the vertical leg 96 of the grasper bar and pivoted in a counterclockwise direction from the position identified by reference character 278a to the position identified by reference character 278b, pulling connecting rod 269 forwardly and pivoting operating lever 264 (see FIGURE 1) counterclockwise from the position identified by reference character 264a to that identified by reference character 264b. As operating lever 264 pivots, it moves operating rod 242 forwardly, rotating the fingers 230 and 232 of the hop vine aligning assembly 160 counterclockwise about pivot studs 234 from the position shown in FIGURE 8 to the position shown in FIGURE 4.

Figure 13:
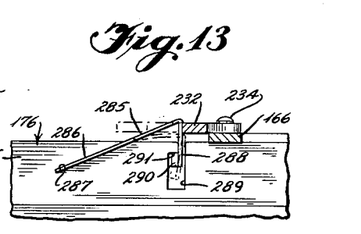
FIGURE 13 is another sectional view of the vine positioning and aligning mechanism and is taken substantially along line 13—13 of FIGURE 4.

When the fingers reach the latter position, they are latched by the latch 285 shown in FIGURE 13 which is a spring member having an inclined leg 286 fixed in a slot 287 in the vertical leg 185 of angle iron 176 as by welding or brazing. Leg 286 extends above aligning assembly finger 232 and terminates in a vertically depending leg 288 which extends into a slot 289 formed in the vertical leg of the angle. A stop 290, fixed to the lower end of depending leg 288, normally engages a horizontally extending edge 291 in slot 289 and prevents latch 285 from springing out of the slot.

As finger 232 pivots from the position of FIGURE 9 to the position of FIGURE 4, it rides over the inclined leg 286 of latch mechanism 285, depressing the latch to the position shown in dotted lines in FIGURES 13. After the finger reaches the FIGURE 4 position, latch 285 will spring upwardly to the position shown in full lines, its vertically extending leg 288 engaging finger 232 and preventing it from rotating in the clockwise direction. Thus, vines 30 which otherwise would not be properly positioned by the Pomona conveyor against stop assembly fingers 164 and 166 due to variations in the relative movement of the Pomona and hop picking machine conveyors will, by the pivotal movement of aligning assembly fingers 230 and 232, be pushed against the stop assembly fingers and held in this position as the graspers 38 and 38¹ move upwardly over end sprockets 74 of the hop picking machine conveyor.

With continued operation, the relation of actuating lever 278 and grasper bars 82 may become altered so that the grasper bars move the actuating lever through an increased stroke, tending to pivot aligning assembly fingers 230 and 232 counterclockwise beyond the positions shown in FIGURE 4. The hop vines 30, however, will prevent movement of the fingers beyond the FIGURE 4 positions and override spring 284 will, at the same time, permit continued counterclockwise movement of actuating lever 278 without damage to the hop vine aligning assembly operating mechanism.

Figure 16:
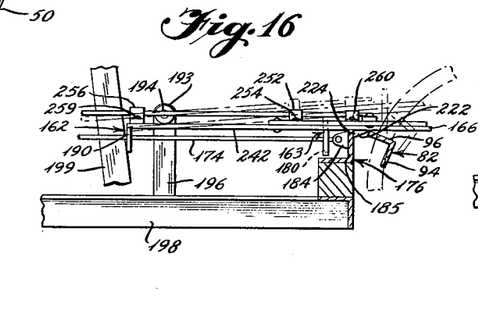
FIGURE 16 is a side view of a portion of the hop vine aligning and positioning mechanism, illustrating the manner in which it is released from its extended, latched position by the passage of a grasper bar carried by the conveyor of the hop picking machine.

Referring now to FIGURE 16, as a grasper bar 82 moves upwardly over end sprockets 74 past the position where hop vines 30 are clamped in graspers 38 and 38¹, the vertical leg 96 of the grasper bar will engage the lower surfaces of stop fingers 164 and 166, lifting them from the position shown in full lines in FIGURE 16 to the position shown in dotted lines, the elongated slots 186 in stop assembly bar 163 permitting the fingers to move upwardly relative to the rods 172 and 174 on which they are normally supported. As the stop assembly fingers 164 and 166 move upwardly, stop assembly latch 222 is raised above the vertical leg 185 of channel 176 and finger 232 of the hop vine aligning assembly 160 is raised above latch 285.

Referring now to FIGURE 3, the hop vine stop assembly operating lever 199 is then returned to its normal inoperative position by a tension spring 292 attached at one end to a bracket 293 fixed to a horizontally extending channel 294 in the hop picking machine framework and, at its opposite end, to a lug 295 fixed to operating lever 199. At the sime time stop assembly 158 is returned to its inoperative, retracted position by a tension spring 300 attached, at one end, to a lug 302 fixed to a horizontally extending brace 304 in the hop picking machine framework and, at the other end, to a vertically extending lug 306 fixed as by welding to the horizontal leg 258 of stop assembly channel 162.

As is shown in FIGURE 14, the clockwise movement of operating lever 199 to its inoperative position is terminated by the engagement of the lever with a stop 296. Stop 296 has bifurcated arms 297 which engage the opposite sides of bracket 202 and prevent the stop from rotating. Stop 296 may be adjusted by rotating an adjusting screw 297 which is rotatably fixed to the stop and extends through an internally threaded adjusting screw support 298 fixed to the lower edge of bracket 202.

Simultaneously with the above-described return movement of operating lever 199 and stop assembly 158, the fingers 230 and 232 of the hop vine aligning assembly 160 are rotated in a clockwise direction from the position shown in FIGURE 4 to the normal, inoperative position shown in FIGURES 8 and 9 by a tension spring 308 connected, at one end, to a bracket 310 fixed to a horizontally extending channel 312 in the hop picking machine framework. The opposite end of spring 308 is attached to a lug 314 fixed to operating lever 264 adjacent its lower end whereby the spring pivots the operating lever in a clockwise direction about pivot stud 267.

Figure 17:
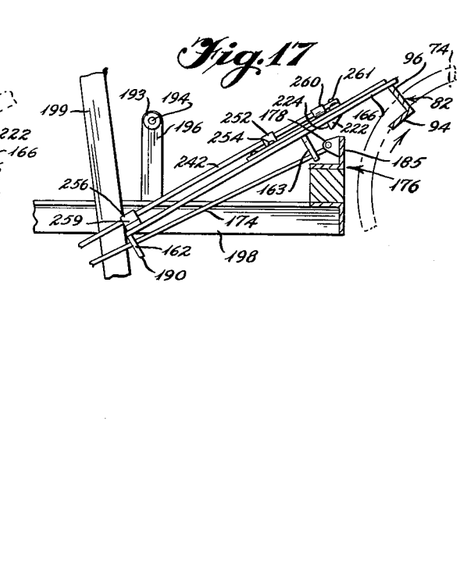
FIGURE 17 is a view similar to FIGURE 16, illustrating the manner in which the mechanism is operated if it fails to unlatch in the normal manner.

Referring now especially to FIGURE 17, if the fingers 164 and 166 of stop assembly 158 are not released in the normal manner described above, continued upward movement of grasper bar 82 around end sprockets 74 to the position of FIGURE 17 will tilt the hop vine stop assembly 158 and the hop vine aligning assembly 160 in a counterclockwise direction about pivot studs 178, releasing the stop assembly fingers 164 and 166 and the aligning assembly fingers 230 and 232. These assemblies will then be pivoted in a clockwise direction about the pivot studs to the normal position in which the upper surfaces of fingers 164 and 166 bear against rollers 193 by tension spring 300.

Figure 21:
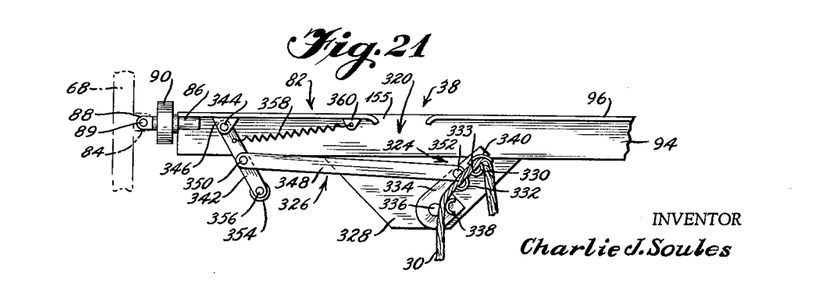
FIGURE 21 is a top plan view of the grasper of FIGURE 20.

FIGURES 21 and 22 illustrate an alternate embodiment of grasper 320 constructed in accordance with the principles of the present invention. Grasper 320 includes what may be termed a fixed jaw 322, a movable jaw 324, and an operating mechanism 326 and is mounted on a base plate 328 which is identical to the base plate 98, described above. The grasper bar 82 to which base plate 328 is fixed is identical to the grasper bar 82 described above.

Fixed jaw 322 consists of a pair of arcuately sectioned jaw members 330 and 332 fixed to and extending upwardly from base plate 328 and disposed so that their flat edge surfaces 333 are aligned in the same plane. Movable jaw 324 includes an arm 334 pivotally fixed to base plate 328 by pivot stud 336. Fixed to and extending vertically upward from arm 334 are a pair of arcuately sectioned members 338 and 340, similar to the arcuately sectioned members 330 and 332 described above.

Operating mechanism 326 includes an operating lever 342 fixed at one end by a pivot pin 344 between a pair of mounting lugs 346 attached to the vertical leg 96 of grasper bar 82. Extending between operating lever 342 and the pivotable arm 334 of movable jaw 324 is a rigid connecting link 348 pivotally connected to the operating lever and arm 334 by pivot studs 350 and 352. Fixed to the end of operating lever 342 opposite its connection to mounting lugs 346 is a cam roller 354 rotatably mounted on a shaft 356 which may be fixed to operating lever 342 in the same manner that shaft 140, described above, is fixed to operating lever 128.

As in the grasper 38 described above, the jaws of grasper 320 are spread apart by the cooperation of cam rollers 354 and a member providing a suitable cam surface such as the angle irons 154 described above. As the roller 354 rides over the jaw closing portion of the cam surface, the jaws are closed by a tension spring 358 attached at one end to operating lever 342 and at the other to a lug 360 fixed to the vertical leg 96 of the grasper bar 82. When grasper 320 is closed, the hop vine end is securely clamped between member 330 of the fixed jaw and the concave surface of member 340 of the movable jaw.

It is to be understood that graspers 38 and 320 are not limited in application to hop picking machines providing automatic transferral of the hop vines from the Pomona conveyor to the conveyor of the hop picking machine. On the contrary, the operators 128 and 342 of these graspers may be manually operated where automatic transferral of the hop vines is not desired. To facilitate manual operation of graspers 38 and 320, the cam roller 140 (or 354) and its supporting structure may be deleted and a handle of conventional construction formed integrally on or fixed to the end of the operator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A hop picking machine comprising:
  (a) a delivery conveyor;
  (b) an endless conveyor, said endless conveyor having a pair of end sprockets supporting a pair of spaced apart, parallel, endless members and at least one grasper bar extending between and fixed at its opposite ends to said members, said endless conveyor further being substantially horizontal providing an upper and lower run and having a direction of travel such that said grasper bar moves along the lower run of said conveyor, upwardly around said end sprockets, and along the top run of said conveyor;
  (c) at least one grasping device connected to said grasper bar, said grasping device having a pair of relatively movable jaws adapted to grasp a vine therebetween;
  (d) means including a cam follower for first opening and then snapping shut said jaws;
  (e) means fixed to the frame of said machine providing a stationary cam surface operatively associated with said cam follower, said cam surface-providing means being positioned to open the jaws of said grasper device as said grasper bar approaches said end sprockets and to snap said jaws shut as said grasper bar passes over said end sprockets;
  (f) alignment means adjacent the feed end of said endless conveyor for guiding hop vines into the jaws of said grasping device, said alignment means including a slidably mounted member having a pair of fingers automatically movable from retracted positions into operative positions adjacent said grasping device and means for moving said fingers between the inoperative and operative positions including actuating means positioned in the path of movement of said grasper bar for operation thereby and means operatively connecting said actuating means and said slidably mounted member.

2. The hop picking machine as defined in claim 1, wherein said endless conveyor has a plurality of grasper bars and wherein said means for moving said fingers to their operative positions comprises a pivotable lever adapted to engage said slidably mounted member, an operating lever pivoted to the frame of said machine, with its free end disposed in the path of said grasper bars as they move along the upper run of said conveyor, and a rigid link pivotably connected at one end to said pivotable lever and at the other to said operating lever.

3. The hop picking machine as defined in claim 1 including resilient biasing means for returning said fingers to their inoperative positions.

4. The hop picking machine as defined in claim 1 including means for pushing hop vines against the fingers of said aligning means including a lever pivotably fixed to each of said fingers, a rigid link pivoted at its opposite ends to said levers, and means for rotating said levers from inoperative positions to operative positions wherein said levers form small acute angles with said fingers.

5. The hop picking machine as defined in claim 4 including means for latching said pivotable levers in the operative position and means for automatically unlatching said levers after the hop vines held by said levers have been grasped by the grasping devices on a passing grasper bar.

6. The hop picking machine as defined in claim 4, wherein the means for rotating said levers to their operative positions comprises a movable member pivotably fixed at one end to said rigid link, a pivoted closing lever pivotably fixed to the opposite end of said movable member, and means operated by the movement of said grasper bars along the upper run of said conveyor for pivoting said closing lever.

7. The hop picking machine as defined in claim 6 including resilient biasing means for returning said pivotably mounted members to their inoperative positions.

8. The hop picking machine as defined in claim 1 including means for latching said fingers in the operative positions, said means being unlatched by said grasper bar following the snapping shut of the grasping devices carried by said bar.

9. The hop picking machine as defined in claim 8, including means mounting said slidable member for pivotal movement about a horizontal axis whereby, if said latching means fails to unlatch, said member will be tilted by said grasper bar as it moves upwardly, allowing passage of said bar around said sprockets.

10. In a hop picking machine; a delivery conveyor; an endless conveyor; grasping devices carried by said endless conveyor; means operated solely by said machine for sequentially opening and closing said grasping devices to secure in said devices hop vines delivered to said endless conveyor; retractable alignment means adjacent the feed end of said endless conveyor for guiding hop vines into said grasping devices; actuating means for said alignment means; and means incorporated in said endless conveyor for operating said actuating means.

11. The combination as defined in claim 10, including means for pushing and holding the hop vines against said aligning means to insure that said vines are properly positioned in relation to said grasping devices, operation of said pushing and holding means being automatically effected by the movement of said endless conveyor.

12. The hop picking machine as defined in claim 10, including means for pushing hop vines against said alignment means to accommodate variations in the rate at which the hop vines are delivered to said endless conveyor, actuating means for said alignment means; and means incorporated in said conveyor for operating said actuating means.

13. In the combination of a hop picking machine having an endless conveyor, a delivery conveyor for delivering hop vines to said endless conveyor, and grasping devices at intervals along said endless conveyor for receiving and grasping vines delivered to said endless conveyor by said delivery conveyor; the improvement of means for automatically transferring hop vines from said delivery conveyor to said endless conveyor and securing them in said grasping devices, comprising: cooperating stationary means and means incorporated in said grasping devices for periodically actuating said grasping devices to secure the hop vines therein; and aligning means adjacent the feed end of said endless conveyor for guiding said vines into said grasping devices including movable guiding members and means for effecting vine guiding movement of said members in timed relation with the actuation of said grasping devices including an actuator and means incorporated in said conveyor for operating said actuator.

14. In a hop picking machine; a delivery conveyor; a continuously operated endless conveyor; sequentially operated grasping devices on said endless conveyor; means to sequentially operate said grasping devices; and retractable alignment means adjacent the feed end of said endless conveyor for receiving hop vines from said delivery conveyor and guiding them into said grasping devices.

References Cited by the Examiner

UNITED STATES PATENTS

| | | | |
|---|---|---|---|
| 2,612,982 | 10/52 | Michaux | 198—24 |
| 2,676,838 | 4/54 | Gardner | 294—104 |
| 2,693,070 | 11/54 | Gaut | 214—5.5 |
| 2,700,452 | 1/55 | Regimbol | 198—179 |
| 2,802,562 | 8/57 | Wissemann | 198—179 |
| 2,852,300 | 9/58 | Gardner | 294—104 |
| 2,884,114 | 4/59 | Oberwelland | 198—24 |
| 2,933,206 | 4/60 | Alphin | 214—5.5 |
| 2,950,804 | 8/60 | Ardner | 198—24 |

SAMUEL F. COLEMAN, *Primary Examiner.*

WILLIAM B. LA BORDE, ERNEST A. FALLER,
*Examiners.*